(12) United States Patent
Johannsen et al.

(10) Patent No.: US 11,148,736 B2
(45) Date of Patent: Oct. 19, 2021

(54) BUSHING FOR A TRACK ASSEMBLY

(71) Applicant: Caterpillar Inc., Deerfield, IL (US)

(72) Inventors: Eric J. Johannsen, Washington, IL (US); Chandrasen R. Rathod, Peoria, IL (US); Scott Keele, Germantown Hills, IL (US); Jason L. Sebright, Chillicothe, IL (US); Roger L. Recker, Dunlap, IL (US); Arthur Bland, Peoria, IL (US); Douglas Trent Weaver, Brimfield, IL (US); Thomas J. Yaniak, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 538 days.

(21) Appl. No.: 16/121,011

(22) Filed: Sep. 4, 2018

(65) Prior Publication Data

US 2020/0070908 A1 Mar. 5, 2020

(51) Int. Cl.
*B62D 55/21* (2006.01)
*B21K 23/02* (2006.01)
*B62D 55/20* (2006.01)

(52) U.S. Cl.
CPC ............ *B62D 55/211* (2013.01); *B21K 23/02* (2013.01); *B62D 55/20* (2013.01)

(58) Field of Classification Search
CPC ...... B62D 55/20; B62D 55/205; B62D 55/21; B62D 55/211; B21K 23/02
See application file for complete search history.

(56) References Cited

U.S. PATENT DOCUMENTS

| 3,826,506 | A | | 7/1974 | Eckert | |
|---|---|---|---|---|---|
| 4,108,502 | A | | 8/1978 | Wohlford | |
| 5,249,868 | A | * | 10/1993 | Watts | B62D 55/205 |
| | | | | | 148/570 |
| 6,565,161 | B2 | * | 5/2003 | Anderton | B62D 55/092 |
| | | | | | 305/103 |
| 6,948,784 | B2 | | 9/2005 | Wodrich et al. | |
| 6,951,373 | B2 | * | 10/2005 | Akita | B62D 55/0887 |
| | | | | | 277/628 |
| 7,240,973 | B2 | * | 7/2007 | Takayama | B62D 55/211 |
| | | | | | 305/103 |
| 8,025,346 | B2 | | 9/2011 | Livesay | |

(Continued)

FOREIGN PATENT DOCUMENTS

| JP | 4916365 B2 | 4/2012 |
|---|---|---|
| RU | 2428346 C1 | 9/2011 |
| WO | WO 2018/123758 A1 | 7/2018 |

OTHER PUBLICATIONS

Search Report and Written Opinion in International Application No. PCT/US2019/047933, dated Nov. 18, 2019.

*Primary Examiner* — Jason R Bellinger
(74) *Attorney, Agent, or Firm* — Bookoff McAndrews

(57) ABSTRACT

A bushing assembly for a track assembly includes a first end element, a second end element, and a central element positioned between the first end element and the second end element. The central element may be interference fit or positioned between the first end element and the second end element, and the central element may include a greater hardness than the first and second end elements. The first end element, the second end element, and the central element form a bushing with a longitudinal opening extending longitudinally through the bushing.

20 Claims, 4 Drawing Sheets

(56) References Cited

U.S. PATENT DOCUMENTS

| | | | |
|---|---|---|---|
| 8,684,475 B2* | 4/2014 | Wodrich | B62D 55/12 |
| | | | 305/194 |
| 9,138,805 B2 | 9/2015 | Wodrich | |
| 2001/0001223 A1* | 5/2001 | Miyaura | B62D 55/21 |
| | | | 305/202 |
| 2007/0267390 A1 | 11/2007 | Jiang et al. | |
| 2008/0284245 A1 | 11/2008 | Livesay et al. | |
| 2010/0139993 A1 | 6/2010 | Sebright et al. | |
| 2015/0300499 A1* | 10/2015 | Jensen | B62D 55/21 |
| | | | 305/104 |
| 2018/0162466 A1* | 6/2018 | Johannsen | B62D 55/202 |
| 2020/0122792 A1* | 4/2020 | Lian | F16J 15/106 |

\* cited by examiner

BUSHING FOR A TRACK ASSEMBLY

TECHNICAL FIELD

The present disclosure relates generally to a bushing, and more particularly, to bushings for a track assembly of a machine.

BACKGROUND

Track type machines typically utilize track chains on each side of the machine that engage the ground surface during propulsion of the machine. A plurality of individual links are pivotably coupled via bushing and pin arrangements to form the track chain. A sprocket, driven by an engine of the machine, engages the bushings and translates the chain about one or more idlers. As the chain translates, the connected links engage a ground surface under the machine, for example, via coupled track shoes, and propel the machine on the surface. Track chains can be a straight link chains with alternating inner and outer links, or can be offset link chains where all the links are alike. In both types of track chains, the elements wear over time, particularly the bushings that are continuously engaging with the sprocket in order to propel the machine. Hardening elements of the track chain may increase the durability and wear-resistance of the track chain element, but may also increase the brittleness or otherwise negatively affect the properties of the track chain element. As such, wear-resistance and strength, along with costs of production and maintenance, are often important considerations in the manufacture and assembly of the track chain.

An exemplary track chain is disclosed in U.S. Pat. No. 6,948,784 ("the '784 patent") to Wodrick et al. The '784 patent discloses a track pin bushing for an endless traction chain. The outer surface of the bushing of the '784 patent has been carburized and sequentially quenched. The bushing of the '784 patent includes a wear-resistant coating that is metallurgically bonded to a non-carburized layer that is exposed by the removal of a portion of the outer surface of the bushing, for example, via machining, cutting, lathing, grinding, etc. In another aspect, the bushing of the '784 patent includes a wear-resistant coating that is deposited in and metallurgically bonded to a non-carburized layer that is exposed by the removal of a portion of the outer surface of the bushing. However, in either aspect, the bushings of the '784 patent include a metallurgically bonded portion, which may deform and/or weaken the body of the bushing. While the bushings of the '784 patent may be suitable for some applications, they may not be suitable for other applications.

The bushings of the present disclosure may solve one or more of the problems set forth above and/or other problems in the art. The scope of the current disclosure, however, is defined by the attached claims, and not by the ability to solve any specific problem.

SUMMARY

In one aspect, a bushing assembly for a track assembly may include a first end element, a second end element, and a central element positioned between the first end element and the second end element. The central element may be interference fit or positioned between the first end element and the second end element, and the central element may include a greater hardness than the first and second end elements. The first end element, the second end element, and the central element may form a bushing with a longitudinal opening extending longitudinally through the bushing.

In another aspect, a track link assembly may include a plurality of track links, a pin, and a bushing. The bushing may include a first end element, a second end element, and a central element having a higher wear-resistance than the first and second end portions. When coupled, the track links may apply a longitudinally inward compression force on the end portions to secure the bushing elements together.

In a further aspect, a method of forming a bushing element may include pressing steel to form a first end portion and pressing steel to form a second end portion. The method may also include forming a central portion with a hardness or wear-resistance greater than the first end portion and the second end portion, and securing the first end portion and the second end portion within opposite sides of the central portion to form the bushing element.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term "ground surface" is broadly used to refer to all types of material that is traversed (e.g., dirt, rocks, clay, sand, asphalt, cement, etc.). Moreover, in this disclosure, relative terms, such as, for example, "about," substantially," and "approximately" are used to indicate a possible variation of ±10% in the stated value.

Figure 1:
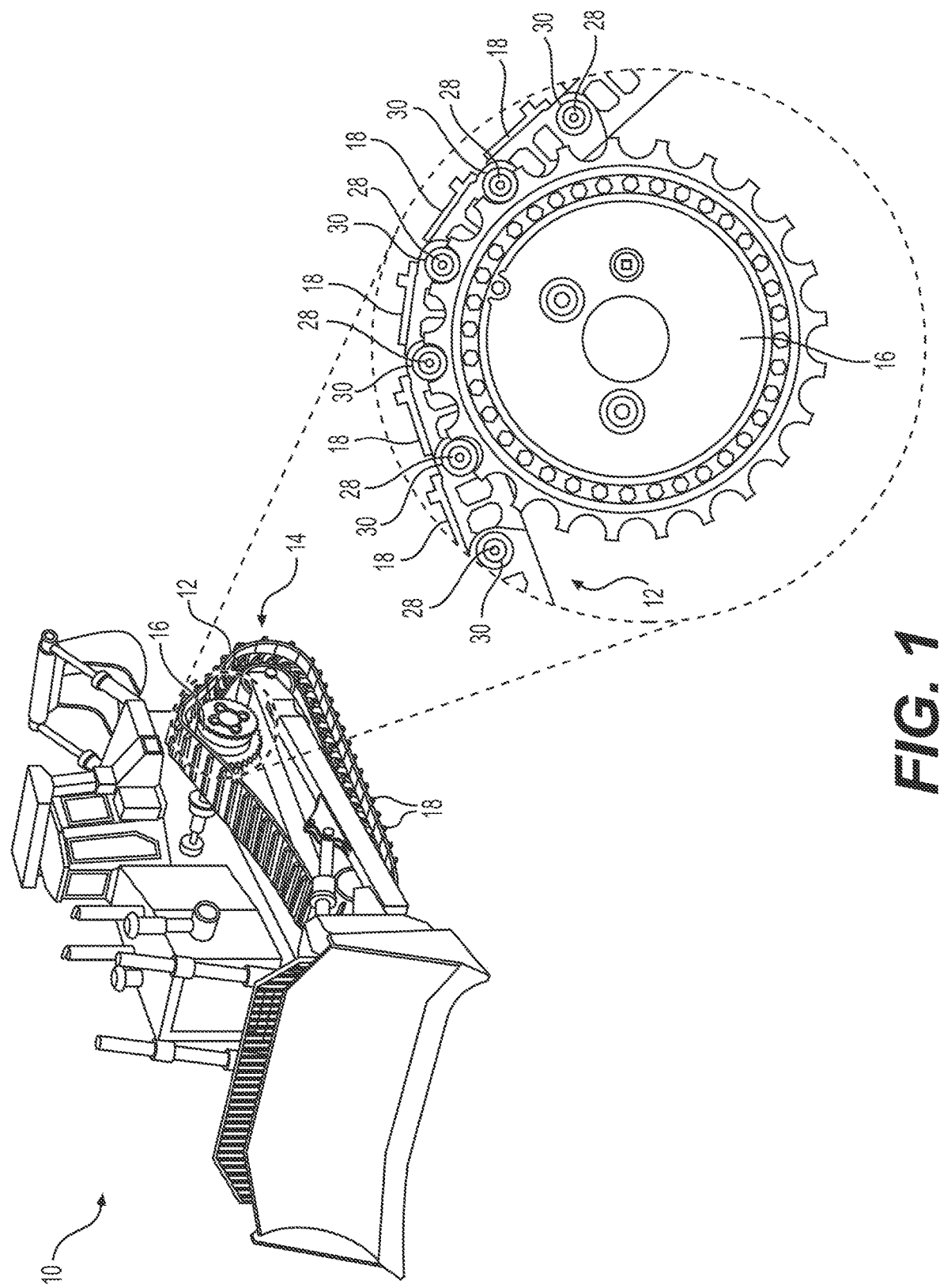
FIG. 1 is a perspective view of a exemplary machine, with an enlarged section of the exemplary machine showing the engagement of a sprocket and bushings of a track assembly.

FIG. 1 illustrates a machine 10 with a track link assembly 12 according to the present disclosure. Machine 10 may be any mobile machine that performs some type of operation with an industry such as mining, construction, farming, transportation, or any other industry known in the art, for example, a dozer, an excavator, a loader, a backhoe, a motor grader, or any other earth moving machine. Track link assembly 12 may be coupled to an undercarriage assembly 14 of machine 10 and driven by a machine engine or other power source (not shown) via at least one drive gear or sprocket 16. A separate track assembly 12 may be coupled to each side of machine 10 and form separate endless loops. A plurality of track shoes 18 may be coupled to an outer surface of track link assembly 12 in order to aid in the engagement of the ground surface.

Figure 2:
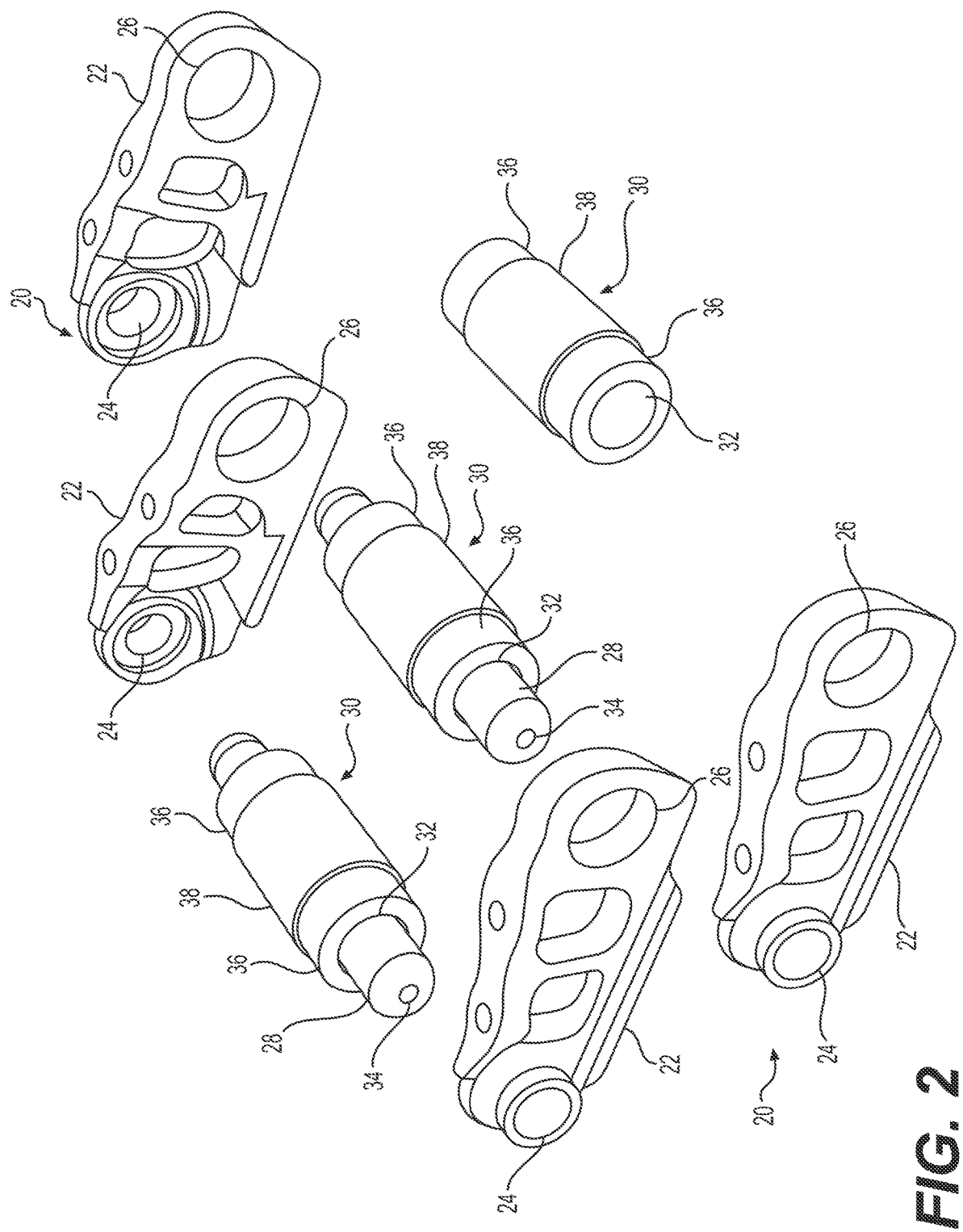
FIG. 2 is a partially exploded view of an exemplary track link assembly that may be coupled to and drive the exemplary machine of FIG. 1.

FIG. 2 illustrates a partially exploded view of a portion of track assembly 12. As shown, track link assembly 12 may be an offset link chain that includes multiple structurally similar link subassemblies 20 that each include a pair of laterally spaced apart and offset links 22. Each link 22 includes apertures (first aperture 24 and second aperture 26) at respective opposite ends and/or spaced apart along a longitudinal axis of each link 22. A first pair of links 22 may form a portion of one side of track link assembly 12 and a second pair of links 22 may form a portion of the other side of track link assembly 12. Although not shown, track link assembly 12 may be a straight link chain with a plurality of alternating inner and outer links.

Individual subassemblies 20 of links 22 are coupled by a pin 28 and a bushing 30. Respective pins 28 may be positioned within an opening 32 extending longitudinally through respective bushings 30. Each pin 28 may extend though portions of adjacent, laterally spaced apart pairs of links 22 in order to rotatably couple adjacent pairs of links 22. For example, pin 28 may pass through first apertures 24 of two forward links 22 and through second apertures 26 of two rear links 22 to connect two link subassemblies 20. Additionally, bushing 30 may pass through second apertures 26 of the rear links 22. Pin 28 may be fixedly received in first apertures 24, and bushing 30 may be fixedly received in second aperture 26. As such, pin 28 and bushing 30 couple two link subassemblies 20 together to form a portion of track link assembly 12.

Although not shown, track link assembly 12 may include a master link assembly that couples two free ends of the chain to form an endless track chain (i.e., a chain that forms an endless loop). Furthermore, it is noted that, for clarity, the right end of the depicted portion of track assembly 12 in FIG. 2 is shown without pin 28. Additionally, one or more seals, for example, a rubber gasket or ring of another elastomeric material, may be positioned around pin 28. For example, the seals may be positioned around pin 28 on both sides of bushing 30. In one aspect, the seals may be coupled to bushing 30 and surround opposite sides of opening 24. When pin 28 and bushing 30 are coupled between links 22, the seals may be compressed between end portions 36 of bushing 30 and an interior face of links 22. As such, the seals may radially expand and form fluid-tight closures around pin 28 such that any lubricating material within opening 32 is contained within opening 32, which may also help to prevent any other material (e.g., dirt) from entering opening 32. Accordingly, the seals may help ensure the smooth rotation of pin 28 relative to bushing 30 over the lifetime of the link subassembly 20. It is noted that, in the sealed arrangement, pin 28 and bushing 30 are rotatable relative to one another.

Each pin 28 may be a substantially cylindrical rod, and may be sized to be slip fit through opening 32 of bushing 30 and fixedly fit within first aperture 24. In one aspect, each pin 28 may include a pin opening 34 extending through a central portion of pin 28. Pin opening 34 may receive a screw, bolt, or other securing member with a widened portion to help retain pin 28 in first aperture 24. Pin 28 may be formed of any appropriate metal, and may be heat-treated to harden pin 28.

Each bushing 30 may be generally cylindrical with a cylindrical channel extending longitudinally therethrough to form opening 32. Opening 32 may be a constant diameter to rotatably receive pin 28. Bushing 30 includes two end portions 36 and a central portion 38. In one aspect, each of the end portions 36 and central portion 38 may be separate elements or components, for example, made with different materials and/or with a different hardness, durability, or other properties. End portions 36 may be pressed together, with central portion 38 received between end portions 36 to form bushing 30. Additionally, bushing 30 may include an adhesive, a resin, a sealant, etc., to help couple end portions 36 to each other and/or end portions 36 to central portion 38.

Figure 3:
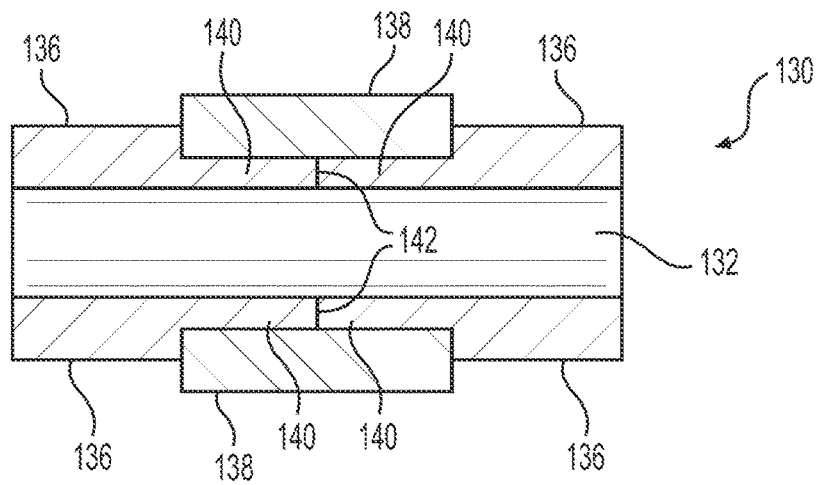
FIG. 3 is a cross-sectional view of an exemplary bushing of the track link assembly of FIG. 2.
Figure 4:
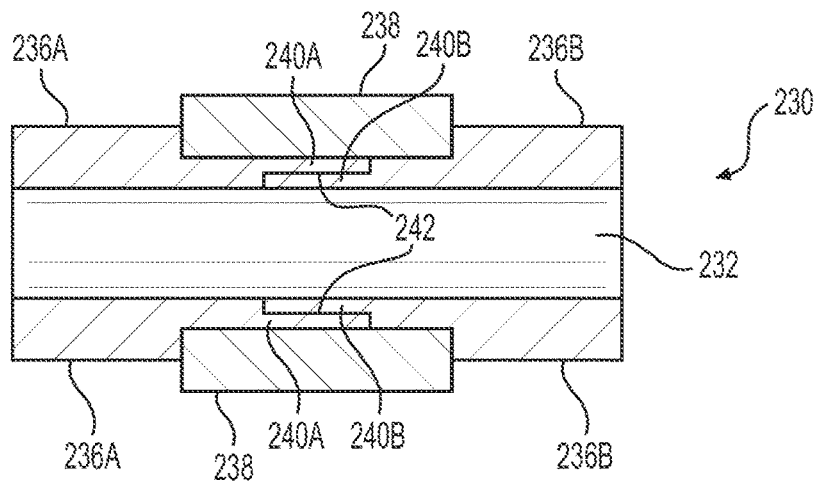
FIG. 4 is a cross-sectional view of an additional exemplary bushing of the track link assembly of FIG. 2.
Figure 5:
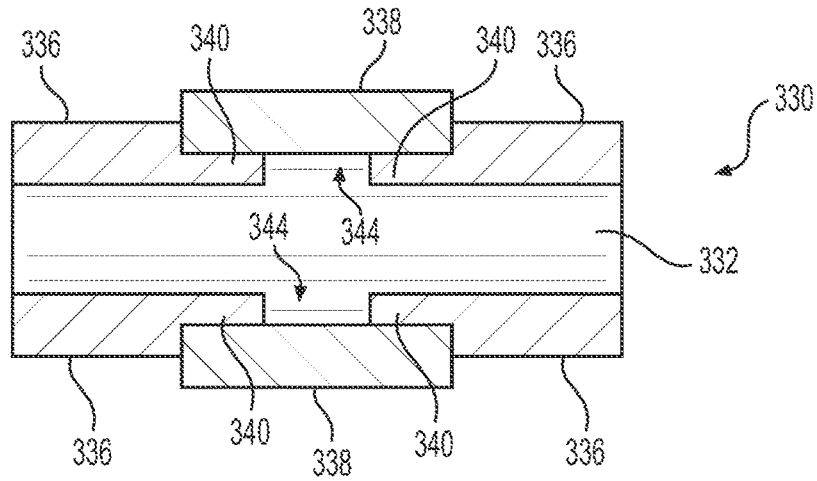
FIG. 5 is a cross-sectional view of yet another exemplary bushing of the track link assembly of FIG. 2.

FIGS. 3-5 illustrate bushings 130, 230, and 330, which are different variations of bushing 30. FIG. 3 illustrates a cross-sectional view of bushing 130 according to one aspect of this disclosure. For example, bushing 130 includes two end portions 136 and a central portion 138. In this aspect, end portions 136 include inner extensions 140 that extend radially within central portion 138 when assembled. Inner extensions 140 may connect at a connection 142, which may include an adhesive or sealant, for example, a resin, an epoxy, a rubber, or other waterproofing or elastomeric material. The adhesive or sealant may help to prevent oil or lubricant from within opening 132 from escaping if central portion 138 breaks, cracks, is worn down, or is otherwise damaged. Central portion 138 may fixedly secured to end portions 136, for example, by an interference fit engagement with end portions 136, and may be further retained by an inward compression force from links 22 when coupled to form track link subassembly 20. Alternatively or additionally, central portion 138 may be adhesively coupled to end portions 136.

FIG. 4 illustrates a cross-sectional view of a bushing 230 according to another aspect of this disclosure. For example, bushing 230 includes two end portions 236A and 236B and a central portion 238. In this aspect, a first end portion 236A includes a first inner extension 240A, and a second end portion 236B includes a second inner extension 240B. First inner extension 240A and second inner extension 240B may extend radially within central portion 238 when assembled. First inner extension 240A and second inner extension 240B may be complementary such that first inner extension 240A and second inner extension 240B at least partially overlap over a longitudinal length of bushing 230. In one aspect, first inner extension 240A may be radially closer to central portion 238 and second inner extension 240B may be radially closer to opening 232. As such, first inner extension 240A and second inner extension 240B may overlap at connection 242. First inner extension 240A and second inner extension 240B may be interference fit (i.e., press fit, friction fit, etc.) or otherwise secured together, and/or the overlap at connection 242 may also include an adhesive or sealant to aid in the coupling of first inner extension 240A and second inner extension 240B. The adhesive or sealant may help prevent oil or lubricant from within opening 232 from escaping if central portion 238 or inner extensions 240A and 240B break, crack, are worn down, or are otherwise damaged. Central portion 238 may be interference fit between end portions 236A and 236B, for example, retained by an inward compression force from links 22 when coupled to form track link subassembly 20. Alternatively or additionally, central portion 238 may be adhesively coupled to end portions 236A and 236B.

FIG. 5 illustrates a cross-sectional view of a bushing 330 according to one aspect of this disclosure. For example, bushing 330 includes two end portions 336 and a central portion 338. In this aspect, end portions 336 include inner extensions 340 that extend radially within central portion 338 when assembled. Inner extensions 340 do not connect such that there is a gap 344 between inner extensions 340. Gap 344 extends radially within central portion 338. Nevertheless, gap 344 may include an adhesive or sealant, which may help to prevent oil or lubricant from within opening 332 from escaping if central portion 338 breaks, cracks, is worn down, or is otherwise damaged. Central portion 338 may be interference fit between end portions 336, for example, retained by an inward compression force from links 22 when coupled to form track link subassembly 20. Alternatively or additionally, central portion 338 may be adhesively coupled to end portions 336.

Figure 6:
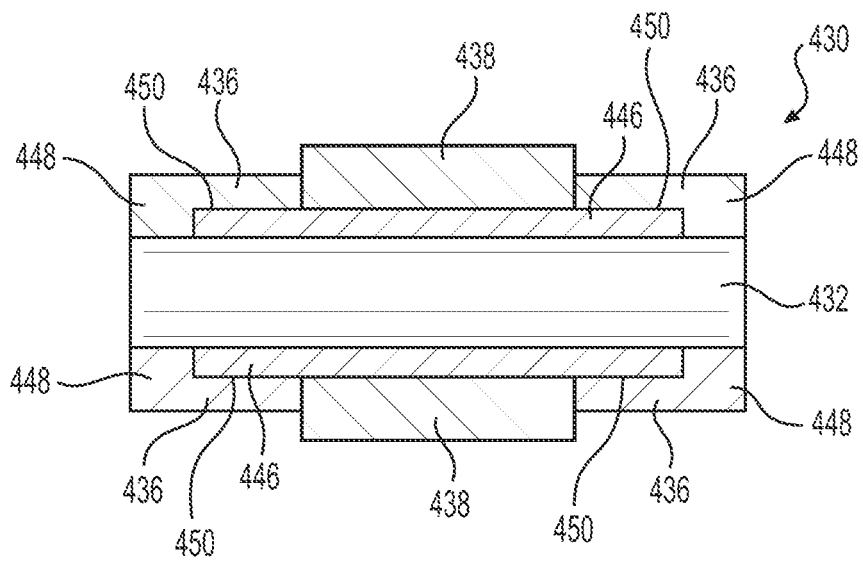
FIG. 6 is a cross-sectional view of yet another exemplary bushing that may be included in the track link assembly of FIG. 2.
Figure 7:
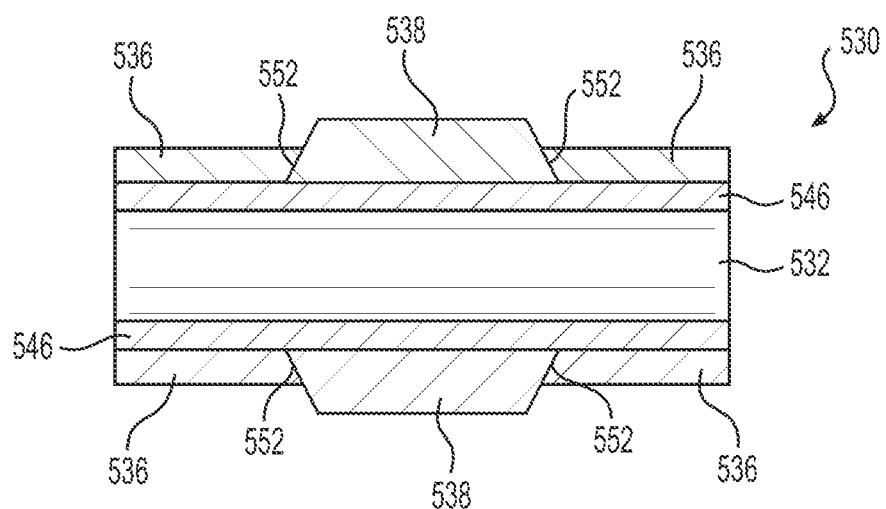
FIG. 7 is a cross-sectional view of a further exemplary bushing that may be included in the track link assembly of FIG. 2.

FIGS. 6 and 7 illustrate cross-sectional views of additional bushings 430 and 530 that may be used in place of bushing 30 in the track link assembly 12 and undercarriage assembly 14 of FIGS. 1 and 2. As shown in FIG. 6, bushing 430 includes a two end portions 436 and a central portion 438. Additionally, bushing 430 includes an inner bushing portion 446. Inner bushing portion 446 may be substantially cylindrical, and extend radially within central portion 438 such that inner bushing portion 446 is between central portion 438 and opening 432. Accordingly, inner bushing portion 446 may support central portion 438 and/or help to distribute a load on central portion 438. A cross-section of end portions 436 may form an L-shape collar, with a widened portion 448 at the outer end of each end portion 436. As such, each end of inner bushing portion 446 may be interference fit within end portions 436 between widened portions 448 of end portions 436 to form connections 450 when assembled. Connections 450 may additionally or alternatively include an adhesive or sealant, for example, a resin, an epoxy, a rubber, or other waterproofing or elastomeric material. The adhesive or sealant may help to prevent oil or lubricant within opening 432 from escaping if a portion of bushing 430 breaks, cracks, is worn down, or is otherwise damaged. Central portion 438 may be fixedly secured to end portions 436 and inner bushing portion 446, for example, pressed between end portions 436 and by a interference fit engagement with inner bushing portion 446. The components may be further retained by an inward compression force from links 22 when coupled with pin 28 to form track link subassembly 20. Alternatively or additionally, central portion 438 may be adhesively coupled to end portions 436 and inner bushing portion 446.

As shown in FIG. 7, bushing 530 includes a two end portions 536 and a central portion 538. Additionally, bushing 530 includes an inner bushing portion 546. Inner bushing portion 546 may be substantially cylindrical, and extend radially within central portion 538 such that inner bushing portion 546 is between central portion 538 and opening 532. Accordingly, inner bushing portion 546 may support central portion 538 and/or help to distribute a load on central portion 538. End portions 536 may be substantially cylindrical, and inner bushing portion 546 may also extend radially within end portions 536 such that inner bushing portion 546 is between end portions 536 and opening 532. As such, inner bushing portion 546 may extend the entire longitudinal length of bushing 530 such that each end of inner bushing portion 546 is received within and/or abuts a portion of link 22 to form track link assembly 20. Moreover, inner bushing portion 546 and end portions 536 may be longitudinally aligned at the ends of bushing 530. End portions 536 and central portion 538 may be interference fit with inner bushing portion 546, and central portion 538 may be pressed between end portions 536 to form connections 552 when assembled. In one aspect, central portion 538 may include a substantially trapezoidal cross-section, and end portions 536 may include a cross-sectional shape with an inner angled portion that corresponds to the shape of central portion 538. As such, connections 552 may extend at an acute or obtuse angle relative to the longitudinal axis of bushing 530. Connections 552 may include an adhesive or sealant, for example, a resin, an epoxy, a rubber, or other waterproofing or elastomeric material, as discussed above. The components of bushing 530 may be further retained by an inward compression force from links 22 when coupled with pin 28 to form track link subassembly 20. Alternatively or additionally, central portion 538 may be adhesively coupled to end portions 536 and inner bushing portion 546.

Although a radially outer face of central portion 38, 138, 238, 338, 438, and 538 is shown as extending radially beyond radially outer faces of end portions 36, 136, 236, 336, 436, and 536, for example, by approximately 10-12 mm, this disclosure is not so limited. In one aspect, the outer face of central portion 38, 138, 238, 338, 438, and 538 may be substantially aligned with the outer faces of end portions 36, 136, 236, 336, 436, and 536. Moreover, the outer faces of end portions 36, 136, 236, 336, 436, and 536 may alternatively extend radially beyond the outer face of central portion 38, 138, 238, 338, 438, and 538. In another aspect, end portions 36 and 136 may be formed of a single piece of material, and central portions 38 and 138 may be friction fit or otherwise coupled in a recess in the one piece end portions 36 and 136. For example, central portions 38 and 138 may be formed in two semi-cylindrical shapes, compression fit within the recess in the one piece end portions 36 and 136, and welded or otherwise joined to form a cylindrical central portion. Similarly, end portions 436 may be coupled to inner bushing portion 446 to form a recess. Central portion 438 may be formed in two semi-cylindrical shapes, compression fit within the recess formed by end portions 436 and inner bushing portion 446, and welded or otherwise joined to form a cylindrical central portion.

End portions 36, 136, 236, 336, 436, and 536 and inner bushing portions 446 and 546 may be formed of a pressed, cold-formed, stamped, or forged material, and central portions 38, 138, 238, 338, 438, and 538 may be formed of hardened and/or heat-treated material. For example, end portions 36, 136, 236, 336, 436, and 536 and inner bushing portions 446 and 546 may be formed of a forged metal, such as, steel. Additionally or alternatively, end portions 36, 136, 236, 336, 436, and 536 and inner bushing portions 446 and 546 may be carburized or induction hardened. Central portions 38, 138, 238, 338, and 438, and 538 may be formed of a wear-resistant material, such as, for example, a hardened or heat-treated steel, a hard ceramic, etc. Central portions 38, 138, 238, 338, 438, and 538 may include one or more coatings to increase wear-resistance. Central portions 38, 138, 238, 338, 438, and 538 may be welded, sprayed, hardfaced, or otherwise treated in order to increase a hardness of the material before being coupled to end portions 36, 136, 236, 336, 436, and 536, or to inner bushing portions 446 and 546 for FIGS. 6 and 7. As such, central portions 38, 138, 238, 338, 438, and 538 may have a higher hardness, as measured by the Vickers hardness test, the Brinell scale, Rockwell scale, etc. In this aspect, central portions 38, 138, 238, 338, 438, and 538 may also include a higher wear resistance than end portions 36, 136, 236, 336, 436, and 536 and inner bushing portions 446 and 546, for example, as measured by a wear coefficient, which may be based on the hardness under the Vickers hardness test, the Brinell scale, Rockwell scale, etc. Nevertheless, end portions 36, 136, 236, 336, 436, and 536 may be less brittle than central portions 38, 138, 238, 338, 438, and 538 and inner bushing portions 446 and 546.

INDUSTRIAL APPLICABILITY

The disclosed aspects of track link assembly 12 may be used in any machine that includes a tracked undercarriage that includes links coupled together to form one or more tracks. Track link assembly 12 described herein may provide a greater wear-resistance, a longer work duration, an increased performance, a reduced risk of deformation, and a lower likelihood of requiring maintenance or replacement.

Each bushing 30 is formed of end portions 36, 136, 236, 336, 436, and 536 and central portions 38, 138, 238, 338, 438, and 538. Central portions 38, 138, 238, 338, 438, and 538 are engaged by sprocket 16 in order to drive track link assembly 12, and accordingly, may undergo a greater amount of wear while sprocket 16 drives track link assembly 12. Central portions 38, 138, 238, 338, 438, and 538 are formed separately from end portions 36, 136, 236, 336, 436, and 536. As such, central portions 38, 138, 238, 338, 438, and 538 may be hardened to a greater extent than end portions 36, 136, 236, 336, 436, and 536 without the risk of increasing the brittleness, distorting the shape, or otherwise affecting the properties of end portions 36, 136, 236, 336, 436, and 536 or the rest of bushings 30, 130, 230, 330, 430, and 530. Moreover, as shown in FIGS. 6 and 7, inner bushing portions 446 and 546 may help to support central portions 438 and 538 and/or help to distribute load on central portions 438 and 538 to the remaining portions of bushings 430 and 530. As shown in FIGS. 2-7, central portions 38, 138, 238, 338, 438, and 538 may extend radially beyond end portions 36, 136, 236, 336, 436, and 536 for example, by approximately 10-12 mm, so central portions 38, 138, 238, 338, 438, and 538 may help to provide an increased operational lifetime for bushings 30, 130, 230, 330, 430, and 530, as the increased radial thickness may help provide a buffer to help protect the remainder of bushings 30, 130, 230, 330, 430, and 530 as central portions 38, 138, 238, 338, 438, and 538 may wear down over time due to the engagement with sprocket 16. When central portions 38, 138, 238, 338, 438, and 538 have worn down and/or are in need of repair or replacement, a user may simply uncouple central portions 38, 138, 238, 338, 438, and 538 from the remainder of bushings 30, 130, 230, 330, 430, and 530 to repair or replace central portions 38, 138, 238, 338, 438, and 538. Additionally, because central portions 38, 138, 238, 338, 438, and 538 may be formed separately, bushings 30, 130, 230, 330, 430, and 530 may have an increased wear-resistance without the time or expense of hardening the entirety of bushings 30, 130, 230, 330, 430, and 530.

Because a majority of the wear on bushings 30, 130, 230, 330, 430, and 530 is on central portions 38, 138, 238, 338, 438, and 538, end portions 36, 136, 236, 336, 436, and 536 and inner bushing portions 446 and 546 may be formed of a less wear-resistant or less expensive material. Furthermore, because central portions 38, 138, 238, 338, 438, and 538 may be hardened or otherwise heat-treated separately, there is a reduced risk of end portions 36, 136, 236, 336, 436, and 536 and inner bushing portions 446 and 546 warping, becoming distorted, or otherwise changing shape during the formation process. End portions 36, 136, and 236 may also be joined at connections 142 and 242 radially within central portions 38, 138, and 238, which may include an adhesive or sealant and which may help to prevent lubrication around pin 28 within opening 32 from escaping or dirt entering opening 32. Moreover, as shown in FIGS. 6 and 7, inner bushing portions 446 and 546 may extend radially within central portions 438 and 538, either between end portions 436 (FIG. 6) or an entire length of bushing 530 (FIG. 7), which may help to prevent lubrication around pin 28 within openings 432 and 532 from escaping or dirt entering openings 432 and 532.

It will be apparent to those skilled in the art that various modifications and variations can be made to the disclosed system without departing from the scope of the disclosure. Other embodiments of the system will be apparent to those skilled in the art from consideration of the specification and practice of the bushing for a track assembly disclosed herein. It is intended that the specification and examples be considered as exemplary only, with a true scope of the disclosure being indicated by the following claims and their equivalents.

What is claimed is:

1. A bushing assembly for a track assembly, comprising:
   a first end element;
   a second end element; and
   a central element between the first end element and the second end element, wherein the central element is interference fit or positioned between the first end element and the second end element, and wherein the central element includes a greater hardness than the first end element and second end element,
   wherein the first end element, the second end element, and the central element form a bushing with a longitudinal opening extending longitudinally through the bushing,
   wherein the first end element includes a first inner extension,
   wherein the second end element includes a second inner extension, and
   wherein the first inner extension and the second inner extension are either (1) coupled at a connection positioned radially within the central element, or (2) spaced apart by a gap positioned radially within the central element.

2. The bushing assembly of claim 1, wherein the central element is formed of a wear-resistant material and is configured to engage with a sprocket to drive a track link assembly, and wherein the first end element and the second end element are formed of pressed or forged steel.

3. The bushing assembly of claim 1, wherein the first inner extension and the second inner extension are coupled at the connection positioned radially within the central element.

4. The bushing assembly of claim 1, wherein the first inner extension and the second inner extension are complementary such that the first inner extension and the second inner extension are coupled at the connection positioned radially within the central element and at least partially overlap over a longitudinal length of the bushing assembly within the central element.

5. The bushing assembly of claim 4, wherein the longitudinal opening is configured to receive a pin, and wherein the first inner extension is radially farther away from the longitudinal opening than the second inner extension over the overlap.

6. The bushing assembly of claim 1, wherein the first inner extension and the second inner extension are spaced apart by the gap positioned radially within the central element.

7. The bushing assembly of claim 1, wherein a radially outer face of the central element extends radially beyond radially outer faces of the first end element and the second end element.

8. The bushing assembly of claim 7, wherein the radially outer face of the central element extends radially beyond the radially outer faces of the first end element and the second end element by approximately 10 to 12 mm.

9. The bushing assembly of claim 1, wherein the central element is formed a wear-resistant material, and wherein the first end element and the second end element are formed of pressed or forged steel.

10. A track link assembly, comprising:
a plurality of track links;
a pin;
a bushing, wherein the bushing includes a first end element, a second end element, and a central element having a higher wear-resistance than the first end element and the second end element, and wherein, when coupled, the track links apply a longitudinally inward compression force on the first end element and the second end element to secure the first end element, the second end element, and the central element together; and
an inner bushing element, wherein the inner bushing element is interference fit to and positioned between the first end element and the second end element, and wherein the inner bushing element is positioned radially within the central element.

11. The track link assembly of claim 10, wherein the central element of the bushing is formed of a wear-resistant material.

12. The track link assembly of claim 10, wherein the bushing includes a longitudinal opening to receive the pin, and wherein a radially outer face of the central element extends radially beyond radially outer faces of the first end element and the second end element a greater distance from the longitudinal opening.

13. The track link assembly of claim 10, wherein the central element is configured to engage with a sprocket to drive the track link assembly.

14. A method of forming a bushing element for a track assembly, comprising:
pressing steel to form a first end portion;
pressing steel to form a second end portion;
forming a central portion with a hardness or wear-resistance greater than the first end portion and the second end portion; and
securing the first end portion and the second end portion within opposing sides of the central portion to form the bushing element.

15. The method of claim 14, wherein the first end portion includes a first inner extension and the second end portion includes a second inner extension, wherein the first inner extension and the second inner extension are configured to be connected at a connection that is within a radially interior opening of the central portion.

16. The method of claim 15, wherein the inner extensions are complementary such that securing the first end portion and the second end portion includes the first inner extension and the second inner extension at least partially overlapping over a longitudinal length of the bushing element within the central portion.

17. The method of claim 14, further including positioning a pin within an opening of the bushing element and coupling the pin and the bushing element to a plurality of links to form a portion of a link assembly, wherein the links aid in the securing of the first end portion and the second end portion within the central portion by providing a compression force.

18. The method of claim 14, wherein forming the central portion with the hardness or wear-resistance greater than the first end portion and the second end portion includes hardfacing the central portion before coupling the central portion to the first and second end portions.

19. The track link assembly of claim 12, wherein the radially outer face of the central element extends radially beyond the radially outer faces of the first end element and the second end element by approximately 10 to 12 mm.

20. The track link assembly of claim 10, wherein the central element is formed a wear-resistant material, and wherein the first end element, the second end element, and the inner bushing element are formed of pressed or forged steel.

* * * * *